United States Patent [19]
Baglin

[11] Patent Number: 4,826,374
[45] Date of Patent: May 2, 1989

[54] FLOATING CAGED NUT
[75] Inventor: Michel Baglin, Mamers, France
[73] Assignee: Simmonds S. A., France
[21] Appl. No.: 119,051
[22] Filed: Nov. 10, 1987
[30] Foreign Application Priority Data
Nov. 12, 1986 [FR] France ................ 86 15704
[51] Int. Cl.⁴ .......................................... F16B 37/04
[52] U.S. Cl. ................... 411/103; 411/166; 411/999
[58] Field of Search ............. 411/103, 105, 111, 999, 411/112, 176, 177, 84, 85, 166

[56] References Cited
U.S. PATENT DOCUMENTS 2,381,233 8/1945 Summers ..................... 411/176 X
2,409,209 10/1946 Johnson ......................... 411/111
3,219,086 11/1965 Zahodiakin ..................... 411/112
3,695,324 10/1972 Gulistan ......................... 411/111
4,666,355 5/1987 Stover ............................... 411/85
4,695,212 9/1987 Berecz ........................ 411/103 X

FOREIGN PATENT DOCUMENTS 127524 4/1948 Australia ......................... 411/103

Primary Examiner—Lloyd A. Gall
Assistant Examiner—Curtis B. Brueske
Attorney, Agent, or Firm—Steinberg & Raskin

[57] ABSTRACT

A floating caged nut having a cage, a plate mounted within the cage and including foldable tabs, and a nut with a base flange mounted onto the plate and movable in a horizontal plane between the tabs and in a vertical plane due to side lugs projecting from the base flange and engaging openings formed in the opposite side walls of the cage.

7 Claims, 1 Drawing Sheet

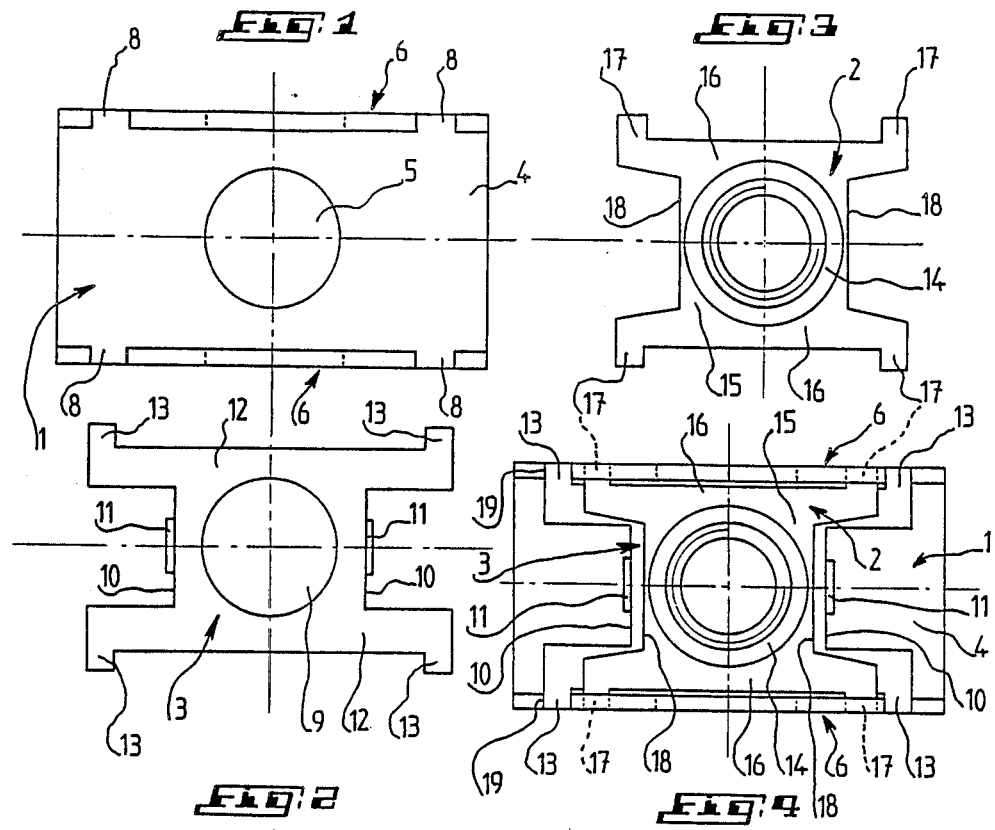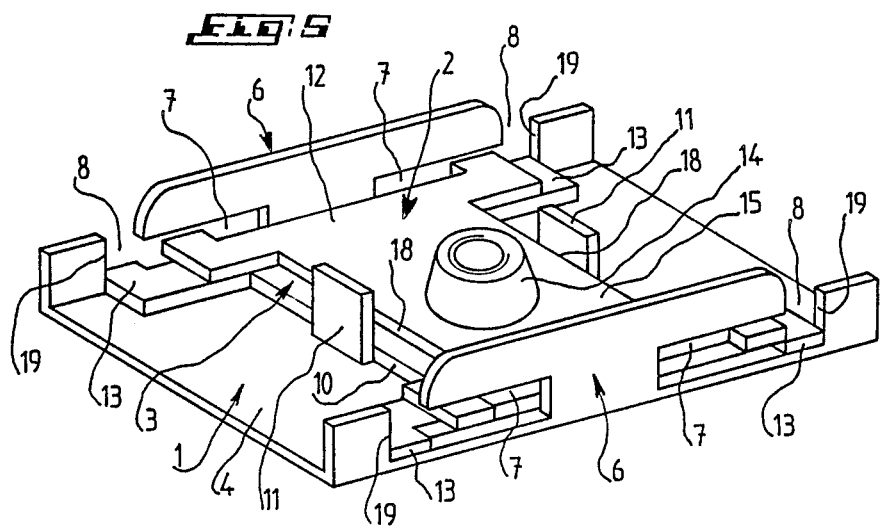

4,826,374

FLOATING CAGED NUT

BACKGROUND OF THE INVENTION

The present invention relates essentially to a floating caged nut.

Nuts were already long known which are mounted in floating relationship in a cage-like holder and which are retained in the cage by means of a circlip or like retaining ring snapped onto the sides of the cage. Such a nut mounting offers the advantage of making it possible to take up the plays upon mounting through screwing and, moreover, allowing the nut to be replaced after removal of the circlip.

This kind of mounting however suffers from a number of drawbacks. In the case of a replacement of the nut, indeed the circlip or like snap ring was difficult to be removed and to be mounted again and, in addition, could be wrongly mounted. It is therefore understandable that, in the case of an assembly of rotating and/or vibrating parts, the wrongly mounted circlip or like snap ring could escape or become separated from the cage and bring about serious damages.

SUMMARY OF THE INVENTION

The object of the present invention is to provide a floating caged nut which would remove the abovementioned inconveniences.

For that purpose, the subject matter of the invention is a floating caged nut of the type comprising means for allowing a collar nut or plate nut to be mount in floating relationship in a cage-like holder or like retainer support and to possibly withdraw the nut from its cage for replacing it, characterized in that said means consist of foldable tabs between which the nut is movable in a substantially horizontal plane and openings formed in the side walls of the cage and in which the flange-like base plate of the nut is displaceable in a substantially vertical direction.

According to a preferred embodiment, said tabs belong to a plate retained within the openings of the side walls of the cage and interposed between the bottom of this cage and the base flange, plate or collar of the nut.

According to another characterizing feature of the invention, said tabs are located on two opposite edges of the plate and extend in substantially vertical relation to the plane of this plate.

Either one of these tabs may be unfolded outwardly to allow the nut to be disengaged from the cage. It will then be sufficient to withdraw the plate and the nut from the cage and to replace them by a new nut-plate set, it being understood that the plate previously withdrawn from the cage is reusable possibly. It will therefore be appreciated that the foldable tabs form simple and effective means to achieve reliable removal and mounting of the nut.

According to a further characterizing feature of the invention, the plate and the base plate or flange of the nut comprise, on their two opposite edges located in front of the side walls of the cage, side lugs engaging the openings of these side walls.

It should moreover be specified that each side wall of the cage comprises, on either side of a medial transverse plane, two openings opening through a cutout outwardly of the side walls of this cage.

The cutout allows the nut to be inserted into its cage.

According to still another characterizing feature of the invention, the spacing between both foldable tabs is slightly greater than the spacing between both opposite edges of the nut base flange co-operating with said tabs.

The nut cage may be made fast through its bottom with any support such as for instance, a strip comprising other floating caged nuts.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and wherein:

FIGS. 1, 2 and 3 are top views of the nut cage, of the plate and of the nut proper, respectively;

FIG. 4 is a top view of the three above-mentioned elements in mounted position and forming the floating caged nut according to the invention; and FIG. 5 is a diagrammatic perspective view of the caged nut.

DESCRIPTION OF THE PREFERRED EMBODIMENTS

Referring to the drawings, there is seen that a floating caged nut according to the principles of the invention essentially comprises a cage 1, a nut 2 and a plate 3 interposed between the cage 1 and the nut 2.

The cage 1 comprises a bottom 4 provided with a hole 5 for the passage of a threaded element therethrough as well as opposite side walls 6. The cage 1 has a substantially U-shaped cross-section, as is well seen on FIG. 5.

As better shown on this FIG. 5, the side walls 6 each comprise, on either side of a central transverse plane, two openings 7 and a cutout 8 so that the openings 7 would open outwardly of the side walls 6 of the cage.

The plate 3 which is to be laid onto the bottom 4 of the cage 1 comprises a hole 9 for the passage of the threaded element (not shown) therethrough as well as two opposite edges 10 including each one a foldable tab 11 integral with and extending from said edges, respectively.

The two other opposite edges 12 of the plate 3 comprise each one side lugs 13 engaging the openings 7 provided in each side wall 6 of the cage 1, as is well shown on FIG. 5.

The nut 2 comprises a tapped body 14 associated with a base flange or base plate 15. This base flange 15 comprises two opposite edges 16 formed each one with side lugs 17 projecting outwards of the base flange 15 and adapted to engage the openings 7 formed in both side walls 6 of the cage 1.

As well shown on FIG. 5, the opposite edges 12 and 16 of the plate 3 and of the nut base flange 15 are facing the opposite side walls 6 of the cage 1 so that the lugs 13 and 17 would engage the openings 7 in the side walls 6 of the cage owing to the cutouts 8.

As clearly shown on FIG. 5, the tabs 11 of the plate 3 extend in substantially vertical relation to the plane of this plate when the nut is in mounted position within the cage 1. It is also shown on FIG. 5 as well as on FIG. 4 that the spacing between the tabs 11 is slightly greater than the spacing between both opposite edges 18 of the base flange 15 of the nut 2 co-operating with said tabs.

Thus, when the nut 2 is in mounted position within its cage, said nut will be displaceable in the cage above the plate 3 along a substantially horizontal plane. Moreover, the nut 2 will be movable in the cage along a substantially vertical direction on account of the fact that the lugs 17 of the nut base flange 15 are vertically movable in the openings 7 provided in the side walls 6 of the cage 1. It is thus understandable that, in this way, the nut 2 is mounted in floating relationship within the cage 1 owing to the tabs 11 of the plate 3 and to the openings 7 in the side walls 6 of the cage.

It should further be pointed out that the plate 3 is held against horizontal translatory motion within the cage 1 because the side lugs 13 of said plate would abut an edge 19 of the openings 7, as shown on FIG. 5.

The caged nut which has just been described may be used as a unit for making any assemblies. Alternatively, it is possible to use a plurality of such caged nuts mounted on any support such for instance as a strip made fast with the bottom 4 of the cage 1.

It will now be described more in detail how the mounting of the nut 2 into its cage 1 and the removal of this nut therefrom in order to replace it by a new nut are carried out.

The plate 3 is at first placed onto the bottom 4 of the cage 1, one of the tabs 11 being bent at right angles to the plate and the other tab 11 having previously been bent to make an obtuse angle with the plate 3. The insertion of the plate into the cage is made possible by the passage of the side lugs 13 of the plate 3 through the cutout 8 formed in the side walls 6 of the cage.

The nut 2 may then be inserted into the cage 1 by passing two lugs 17 through two opposite cutouts 8, whereafter the nut is shifted in translatory motion through various rocking or tilting motions of the cage so that all the lugs 17 be accommodated within the openings 7. The base flange 15 is then applied onto the plate 3 and the tab 11 previously bent according to an obtuse angle is bent upwardly to extend at right angles to the plane of the plate 3 so as to finally obtain the floating caged nut shown on FIG. 5.

There has therefore been provided, according to the invention, a floating caged nut comprising a nut which may be easily mounted and removed through simple bending or unfolding of tabs 11 which provides always for a necessarily proper mounting of the nut into its cage, i.e. a mounting which would never allow the plate to escape or move away.

It should be understood that the invention is not at all limited to the embodiment described and shown which has been given by way of illustrative example only.

Thus, the plate 3 could be omitted and the tabs 11 could be directly made integral with the bottom 4 of the cage although, for obvious technical grounds, it would be preferable that the tabs 11 belong to an intermediate member such as the plate 3. Likewise, the openings 7 may have any shape in accordance with the extent of vertical travel desired for the base flange or base plate of the nut.

What is claimed is:

1. A floating caged nut, comprising
    a cage having a bottom and opposite side walls provided with respective openings,
    a nut movably positionable in the cage, comprising a base flange, and retainable within the cage by tabs, and
    a separate plate on which the tabs are mounted, said plate retainable in the openings of the side walls of the cage and interposable between the bottom of the cage and the base flange of the nut.

2. The floating caged nut of claim 1, wherein
    said plate comprises two opposite edges on which the tabs are mounted to extend in substantially vertical relation to a plane of said plate.

3. The floating caged nut of claim 1, wherein said plate and the nut base flange each comprise
    two opposite edges positionable to face the side walls of the cage, and
    side lugs mounted on the respective opposite edges for engaging the respective openings in the cage side walls.

4. The floating caged nut of claim 1, wherein
    said cage comprises, on either side of a central transverse plane thereof, two of the respective openings and two cutouts,
    with each of the openings communicating with a respective one of said cutouts and thereby opening outwardly from the side walls of the cage.

5. The floating caged nut of claim 1, wherein
    the nut base flange comprises opposite edges arranged to co-operate with the tabs, and
    spacing between the tabs which are foldable is slightly greater than spacing between the opposite edges of the nut base flange arranged to co-operate with the tabs.

6. The floating caged nut of claim 1, wherein the nut cage is fastenable at the bottom thereof to a support.

7. The floating caged nut of claim 6, wherein the support is a strip comprising other floating caged nuts.

* * * * *